United States Patent [19]
Higuma

[11] 3,896,461
[45] July 22, 1975

[54] CAMERA EXPOSURE CONTROL SYSTEM HAVING A DAMPING COIL

[75] Inventor: Toyonori Higuma, Tokyo, Japan

[73] Assignee: Kabushiki Kaisha Yashica, Tokyo, Japan

[22] Filed: Dec. 20, 1973

[21] Appl. No.: 426,586

[30] Foreign Application Priority Data
Dec. 30, 1972   Japan .................................. 47-459

[52] U.S. Cl. .................. 354/44; 352/141; 354/271
[51] Int. Cl. ..... G03b 7/10; G03b 9/02; G03b 19/18
[58] Field of Search ............... 354/44, 271; 352/141

[56]         References Cited
         UNITED STATES PATENTS

| | | | |
|---|---|---|---|
| 3,430,053 | 2/1969 | Westhauer | 354/44 X |
| 3,455,227 | 7/1969 | Sato et al. | 354/44 |
| 3,587,420 | 6/1971 | Llop | 352/141 |
| 3,611,894 | 10/1971 | Minneste, Jr. | 354/44 X |
| 3,696,719 | 10/1972 | Tanikoshi | 352/141 |
| 3,776,111 | 12/1973 | Maida | 352/141 |

*Primary Examiner*—Joseph F. Peters, Jr.
*Attorney, Agent, or Firm*—Christie, Parker & Hale

[57]         ABSTRACT

An automatic exposure control system includes a servomotor driving a camera lens diaphragm to adjust the size of its aperture under the control of a drive signal supplied to a drive coil of the servomotor. Circuit means, including a photoelectric circuit element connected in a bridge circuit, provides an error signal. A damping coil, magnetically coupled to respond to movement of the diaphragm, provides a damping signal. An operational amplifier circuit combines the error signal and the drive signal so as to cause the drive signal to control the servomotor in driving the diaphragm without substantial vibration.

4 Claims, 1 Drawing Figure

CAMERA EXPOSURE CONTROL SYSTEM HAVING A DAMPING COIL

BACKGROUND OF THE INVENTION

The present invention relates in general to automatic exposure control systems and in particular to such systems for movie cameras of the 8 mm type.

Control systems have long been used for adjusting the size of a camera lens diaphragm to effect automatic exposure control. The speed with which adjustments are made is a matter of particular importance in connection with movie cameras.

Prior art movie cameras have included servomechanisms that are intended to respond as rapidly as possible to changing light conditions in effecting automatic exposure control. In such servomechanisms, typically, an error signal is provided by a bridge circuit. The bridge circuit includes as one of its circuit elements a photoelectric element sensing the portion of the object light that passes through the aperture of the diaphragm. The photoelectric element has a resistance that varies depending upon the amount of such light. Other circuit elements in the bridge are variable resistances that are adjusted according to various photographic parameters such as shutter speed (or, equivalently, frame rate), film sensitivity (i.e., ASA number), and the like.

When the amount of such light is proper, the resistance value of the photoelectric element is such as to balance the bridge, whereby the error signal is at a null. Otherwise, the bridge is unbalanced, whereby the error signal has a magnitude and polarity indicative of the extent and direction of the necessary adjustment of the aperture size.

In the operation of the servomechanism, the size of the aperture is adjusted until a balanced bridge condition is achieved. This operation in the past has been attended with a problem relating to vibration of the movable pieces such as the diaphragm. In arrangements in which a driving coil is wound around a movable piece, there occurs considerable vibration in the vicinity of the balance point as a result of such factors as the inertia of the movable piece, the frictional resistance of bearing, the magnitude of electric current and the phase relationship. So that the movable piece can be moved at a relatively high velocity, amplification of the error signal from the bridge is usually provided, this generally proceeding in several steps through elements such as transistors. This is done because it is difficult in general to effect rapid movement of the movable piece where the output of the bridge is used directly. However, the higher the amplification degree so as to accelerate movement of the movable piece, the more remarkable the vibration thereof becomes. There have already been proposed several methods to overcome such a disadvantage. Among these is a method in which a feedback for damping effect is applied to an amplifier circuit which, in turn, includes transistors (for example, a method in which a damping coil is inserted across base-emitter of a differential input stage).

SUMMARY OF THE INVENTION

In accordance with this invention, a control system provides for adjusting the size of the aperture of a camera lens diaphragm so as to provide automatic exposure control, the system being particularly advantageous in combination with movie cameras where rapid response is desirable.

In the control system, there is provided a servomotor. Under the control of a drive signal supplied to its drive coil, the servomotor drives the lens diaphragm to adjust the size of the aperture. Circuit means, including a photoelectric circuit element sensing light passing through the aperture, provides an error signal indicative of whether the aperture size should be increased or decreased for proper exposure. Advantageously, the circuit means is embodied in a bridge circuit that includes the photoelectric element as one of the bridge circuit elements and includes a plurality of variable resistors that are adjusted in resistance value in accordance with such factors as film sensitivity and the like.

A damping coil, magnetically coupled to respond to movement of the diaphragm, produces a damping signal. In a distinguishing feature of the invention there is provided, as a part of circuit means for supplying the drive signal, an operational amplifier circuit for combining the error signal and the damping signal to cause the drive signal to control the servomotor operation in driving the diaphragm without substantial vibration.

DETAILED DESCRIPTION

Figure 1:
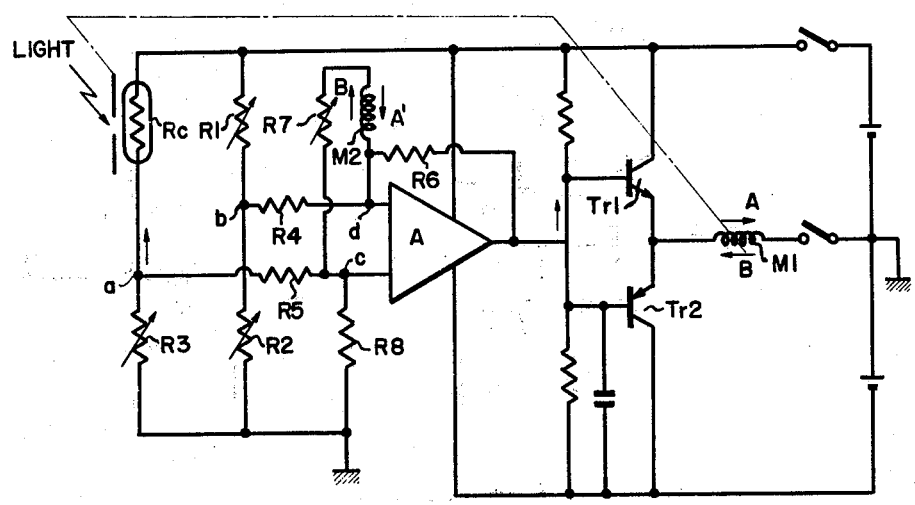
FIG. 1 is a circuit diagram illustrating the preferred embodiment of the invention.

In FIG. 1 there is shown a bridge circuit having a photoelectric circuit element Rc such as a photoconductor which is exposed to light passing through a diaphragm. Three bridge resistances $R_1$, $R_2$ and $R_3$ are variable in accordance with factors such as film photosensitivity value, regulated shutter speed (frame rate) and filter coefficient or for sensitivity adjustment. Output terminals $a$ and $b$ of the bridge circuit are respectively connected to input resistances $R_4$ and $R_5$ that form part of an operational amplifier circuit also comprising an operational amplifier A, a feedback resistor $R_6$, and a resistor $R_8$.

A damping coil $M_2$ for a servomotor as described later and a variable resistor $R_7$ for adjustment of damping sensitivity are serially connected to input terminals $c$ and $d$ of the operational amplifier A. The input terminal $c$ is a non-inverting input terminal and the input terminal $d$ is an inverting input terminal. The feedback resistor $R_8$ is connected between the input terminal $c$ and ground (i.e., 0 volts) while the feedback resistor $R_6$ is inserted between the input terminal $d$ and output terminal of the amplifier A so as to constitute a negative feedback circuit with such negative feedback being provided, the terminals $c$ and $d$ operate with virtually no voltage therebetween in accordance with the "virtual ground" principle of operation of operational amplifier circuits.

The output signal produced by the operational amplifier A serves as an input signal to a servomotor control mechanism of well known art comprising elements such as transistor $Tr_1$ and $Tr_2$ that are connected as complementary symmetry emitter followers. The servomotor adapted to be driven under control of the control mechanism includes a driving coil $M_1$ which is adapted to be energized under regulation of the transistors $Tr_1$ and $Tr_2$. The drive signal supplied by the transistors $Tr_1$ and $Tr_2$, as a result of the emitter-follower arrangement, is caused to have substantially the same magnitude and polarity as the signal at the output of the amplifier A.

In circumstances in which the amount of light to which the photoelectric element is exposed suddenly exceeds a target value for some reason, the photoelectric element has its resistance value reduced. As a result, the potential at the point $a$ becomes higher than potential at the point $b$. The relative magnitude of the voltage signals or potentials is indicative of an error as to the size of the aperture. This error signal is amplified by the operational amplifier circuit, the gain being given by the ratio $(R_6)/(R_4)$ so long as $R_4 = R_5$ and $R_6 = R_8$. In response to the amplified error signal, the transistor $Tr_1$ in the circuit for amplification of output current is turned ON causing electric current to flow through the driving coil $M_1$ in the direction A. A movable piece is thus rotated in such a direction that light to which the photoelectric element is exposed is interrupted by said movable piece. Simultaneously, the damping coil $M_2$, wound around said movable piece, intersects flux of a magnetic field, causing an electromotive force in said coil. This constitutes a damping signal that the operational amplifier circuit combines with the error signal. In combining the two signals, a negative feedback is exerted. Potential at the point $c$ exceeds potential at the point $d$, as resistance of the photoelectric element, and damping current flows through said damping coil $M_2$ in the direction A'. The damping force thus generated acts in the direction opposed to the driving force and, as a result, the target value is rapidly restored without vibration of the movable piece under a relatively large driving force of the driving coil $M_1$ in the vicinity of said target value.

The resistor $R_7$ for adjustment of damping sensitivity connected to the damping coil $M_2$ may be regulated in its resistance value to regulate the damping force, so that a servomechanism of an extremely high precision may be realized according to the source voltage, the number of turns of the driving and damping coils $M_1$ and $M_2$, and the amplification degree. The reverse operation occurs when the amount of light to which the photoelectric element is exposed is smaller than the target value. The polarities involved in this operation are indicated by the arrows B and B'.

The device according to the present invention wherein, as seen from the foregoing description, an operational amplifier in a drive information processing station of the servomechanism and a damping coil for the servomotor serving as a damping control mechanism for said operational amplifier is connected to the input side of said operational amplifier in a direction such that the input deviation is reduced provides remarkable advantages in its operating effect, with respect to the device of prior art wherein a transistor amplifier is used, as following:

1. The number of parts may be fewer and, accordingly, the cost for incorporation of these parts may be reduced.

2. The incorporation may be achieved at high efficiency, resulting in a stout construction.

3. The temperature and humidity characteristics are so preferably that the demand for compensation thereof may be substantially eliminated.

4. The operational amplifier used for the device according to the present invention requires no consideration of the complementary characteristic between PNP and NPN transistors (this is important particularly for transistors of input stage) or of the hfe unevenness as required in the transistor amplification.

5. The amplification degree may be altered as desired simply by exchange of resistors.

6. The frequency characteristic and the input characteristic are also preferable.

What is claimed is:

1. In a control system for adjusting the size of the aperture of a camera lens diaphragm so as to provide automatic exposure control, the combination comprising:

a servomotor, including a drive coil, for driving the diaphragm to adjust the aperture size under control of a drive signal supplied to the drive coil;

first circuit means for providing first and second voltage signals whose relative magnitude is indicative of whether the aperture size should be increased or decreased for proper exposure, the first circuit means including a bridge circuit having first and second bridge output terminals, the bridge circuit including a photoelectric circuit element connected in one arm of the bridge circuit for sensing light passing through the aperture and, in response thereto, causing the bridge circuit to provide the first and second voltage signals on the first and second bridge output terminals respectively;

a damping coil, magnetically coupled to respond to movement of the diaphragm, for providing a damping signal; and second circuit means for combining the damping signal and the first and second voltage signals to form the drive signal so as to control the servomotor in driving the diaphragm without substantial vibration;

the second circuit means including an operational amplifier having a non-inverting input terminal coupled to respond to the first voltage signal, an inverting input terminal coupled to respond to the second voltage signal, and an amplifier output terminal coupled to the drive coil; negative feedback circuit means connected to the operational amplifier so that the non-inverting and inverting input terminals operate with virtually no voltage therebetween; and the damping coil being connected in series-circuit relationship between the non-inverting and inverting input terminals.

2. The combination of claim 1 wherein the camera is a movie camera.

3. The combination of claim 1 wherein the second circuit means comprises a pair of transistors arranged as complementary symmetry emitter followers for coupling the operational amplifier output terminal to the drive coil.

4. The combination of claim 1 wherein the second circuit means includes an adjustable resistor connected in series-circuit relationship with the drive coil.

* * * * *